United States Patent Office 3,320,116
Patented May 16, 1967

3,320,116
BENZOPHENONE AND ACETOPHENONE
STABILIZED POLYMERS
Stanley Tocker, Wilmington, Del., assignor to E. I. du
Pont de Nemours and Company, Wilmington, Del., a
corporation of Delaware
No Drawing. Filed June 12, 1963, Ser. No. 287,214
16 Claims. (Cl. 161—252)

This invention relates to organic polymeric structures and, particularly, to shaped articles such as polymeric films suitable for outdoor use.

This application is a continuation-in-part of my copending application Ser. No. 54,826 filed Sept. 9, 1960, which in turn was a continuation-in-part of my application Ser. No. 847,704 filed Oct. 21, 1959, now abandoned.

Many organic polymeric structures, such as structures of polyethylene, polypropylene and the like deteriorate rapidly when subjected to sunlight. The materials are sensitive to light in the ultraviolet range, particularly in the wave length range of 2900–3800 A. Exposure to the ultraviolet light tends to embrittle the structures and reduce the level of their electrical and physical properties substantially. Some polymers acquire an undesirable color upon exposure to ultraviolet light.

The use of certain chemical compounds as ultraviolet light absorbers in mechanical mixture with the polymers is known. Thus, compounds such as benzophenones or salicyclic acid esters have been incorporated in the molten polymer prior to forming a structure or they have been coated on the surface of the polymeric structure. In either case, the protection afforded by these compounds is not permanent. The compounds gradually exude to the film surface and disappear from the polymeric structure due to mechanical abrasion or volatility.

The object of the present invention is to provide a substantially permanent weather-resistant organic polymeric shaped article, particularly a self-supporting film, suitable for outdoor use. It is a further object to provide a process for incorporating ultraviolet light absorbent compounds into the polymeric articles so that the compounds are firmly attached to the articles. Other objects will appear hereinafter.

The objects are accomplished by a copolymer of 90–99.99 mole percent of at least one unsaturated compound, compound A, having the structural formula:

wherein $R_1$ is selected from the group consisting of hydrogen and alkyl having 1–4 carbon atoms, $R_2$ is hydrogen, and .01–10 mole percent, preferably 0.1–10 mole percent, of at least one unsaturated compound, compound B, selected from the group consisting of:

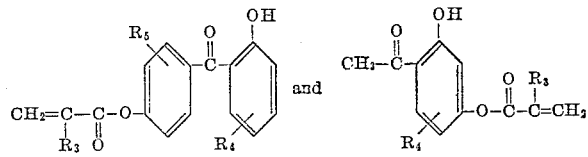

wherein $R_3$ is selected from the group consisting of hydrogen and alkyl having 1–3 carbon atoms, $R_4$ and $R_5$ are each selected from the group consisting of hydrogen, halogen, alkyl and alkoxy, the copolymer preferably having an inherent viscosity of at least 0.3.

Specifically, the objects are accomplished by a copolymer of at least one polymerizable compound selected from the group consisting of ethylene and propylene and .01–10 mole percent, preferably .1–10 mole percent, of at least one ethylenically unsaturated compound selected from the group consisting of 2-hydroxy-4'-methacryloxybenzophenone, 2-hydroxy-4'-acryloxybenzophenone, 2-hydroxy-4-methacryloxyacetophenone and 2-hydroxy-4-acryloxyacetophenone, the copolymer having an inherent viscosity of at least 0.3.

Other light-stabilizing monomers that may be used in the copolymer are:

2-hydroxy-4-ethacryloxyacetophenone,
2-hydroxy-3-chloro-4-methacryloxyacetophenone,
2-hydroxy-4-methacryloxy-6-methoxyacetophenone,
2-hydroxy-4-methacryloxy-5-methylacetophenone,
2-hydroxy-4'-ethacryloxybenzophenone,
2-hydroxy-3-chloro-4'-methacryloxybenzophenone,
2-hydroxy-4-methyl-4'-methacryloxybenzophenone,
2-hydroxy-5-methoxy-4'-methacryloxybenzophenone,
2-hydroxy-2'-chloro-4'-methacryloxybenzophenone,
2-hydroxy-3'-ethyl-4'-methacryloxybenzophenone,
2-hydroxy-4'-methacryloxy-5'-ethoxybenzophenone,
and the like.

Copolymerization of stabilizing monomers with

The process for preparing the copolymers involves subjecting the monomers in a solvent such as hexane, benzene, toluene, to a temperature of 25° to 175° C. and a pressure of 800–3,000 atmospheres in the presence of a conventional peroxide (di-tertiary butyl peroxide) or azo catalyst (alpha, alpha'-azobisdicyclohexanecarbonitrile) catalyst for a contact time sufficient to form the copolymer, usually at least 20 seconds for a continuous process and at least 3 minutes for a batch process, and then isolating the resulting copolymer.

It is believed that the essential feature of this type catalyst, or more properly termed "initiator" is that it is capable of generating free radicals. These free radical initiators, whether they be generated from a peroxide compound or from an azo-type compound combined with a polymerizable monomer to form a new free radical; the new free radical combines with another monomer molecule to form still another free radical; this process is repeated until there is propagated a long polymer chain, as is well known in the art. Polymer chain growth terminates when the free radical-bearing polymer fragment encounters another free radical, which for example, may be another growing polymer chain or an initiator free radical.

Typical peroxides which release free radicals to function as initiators include benzoyl peroxide, di-tertiary-butyl peroxide, di-tertiary-butyl peroxydicarbonate, 2,2-bis-(tertiarybutylperoxy) butane, tertiary-butyl peracetate dimethyl dioxide, diethyl dioxide, dipropyl dioxide, propyl ether dioxide and propyl methyl dioxide. Organic hydroperoxides also applicable are, for example, tertiarybutylhydroperoxide, cumene hydroperoxide, ethyl hydroperoxide, and can be used to initiate polymerizations of this kind. Combinations such as ammonium persulfate with a reducing agent can also be used. Typical azo compounds which decompose to liberate free radicals for initiation of polymerization include such catalysts as alpha, alpha'-azobisdicyclohexanecarbonitrile, alpha, alpha'-azobisisobutyronitrile, triphenylmethylazobenzene, 1,1'-azodicycloheptanecarbonitrile, alpha, alpha'-azobisisobutyramide, lithium azodisulfonate, magnesium azodisulfonate, dimethyl alpha, alpha'-azodiisobutyrate, alpha, alpha'-azobis-(alpha, gamma-dimethylvaleronitrile) and alpha, alpha'-azobis(alpha, beta-dimethylbutyronitrile).

Copolymerization is carried out in an organic solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used. The preferred solvents are the nonpolar and aromatic solvents, e.g. benzene, hexane, cyclohexane, dioxane, etc.

The ratio of the light stabilizing monomer to ethylene and/or other monomer reacted therewith should be such that the final copolymer is composed of .01–10 mole percent, preferably .1–10 mole percent, of the stabilizing compound, the remainder being the other monomer or monomers. Less than .01 percent of the stabilizer does not provide adequate protection against ultraviolet light. More than 10 percent tends to affect adversely the physical properties of the basically polyethylene or polypropylene, etc., structure. Between .1 and 10 percent provides the best protection against ultraviolet light. It has been found that the reaction is very efficient so that a reaction mixture of about .01–10 mole percent of the stabilizing monomer and about 99.99–90 mole percent of the remaining monomer or monomers usually will provide the desired polymer product.

The polymer product, in its preferred form (i.e., reaction product of a light stabilizing monomer and ethylene or the like) is a substantially linear polymer having pendant groups of the formula:

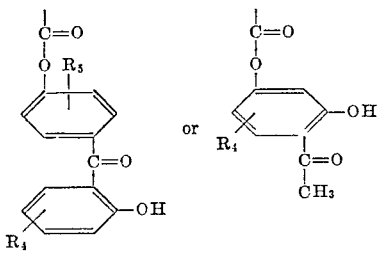

wherein $R_4$ and $R_5$ are each selected from the group consisting of hydrogen, halogen, alkyl and alkoxy, having an inherent viscosity of at least 0.3.

The determination of the structure is accomplished by infrared spectral techniques [1] known to those skilled in the art. The majority of the infrared spectra herein were taken on pressed films by the use of a Perkin-Elmer Model 21 Spectrophotometer and a Perkin-Elmer Infracord Spectrophotometer.

Measurements of ultraviolet light absorption were carried out in accordance with procedures described in "Analytical Chemistry" by C. R. N. Strouts, J. H. Gilfillan and H. N. Wilson, volume II, chapter 22, Oxford University Press, 1955.

The invention will be more clearly understood by referring to the examples which follow, Example 1 representing the best mode contemplated for practicing the invention. It is understood that the examples, although illustrating specific embodiments of the present invention, should not be considered limitative of the invention.

The light stability test used in the examples was carried out by exposing the films to the action of a bank of Westinghouse Sunlamps for the periods indicated.

Inherent viscosity, which is directly related to the molecular weight of the polymer is defined by L. H. Cragg in the Journal of Colloid Science, volume I, pages 261–9 (May 1946) as:

$$\text{Inherent viscosity} = \frac{\text{In relative viscosity}}{C}$$

where relative viscosity is the ratio of the solution viscosity to the solvent viscosity, and C is the concentration of solute in solution measured as grams of polymer per 100 ml. per solution.

*Example 1.—Preparation of 2-hydroxy-4-methacryloxyacetophenone and its copolymerization with ethylene*

A mixture of 7.6 grams of 2,4-dihydroxyacetophenone and 5.0 grams of methacrylyl chloride was treated with 20 ml. of anhydrous pyridine with stirring. After 15 minutes the resultant mixture was heated in a water bath at 70–80° C. for 5 minutes, after which the reactor was cooled and the contents were poured into 600 ml. of 3% aqueous hydrochloric acid containing 100 grams of crushed ice. The aqueous mixture was extracted with ether, the ether extract was dried over anhydrous sodium sulfate and the ether was then removed in a vacuum oven at 40–50° C. The oily product showed an infrared absorption band at 1725 cm.$^{-1}$, characteristic of an ester group and a band at 1650 cm.$^{-1}$, characteristic of bonded carbonyl. Ultraviolet analysis of this material dissolved in carbon tetrachloride showed strong maxima in the spectral region 3100–3300 A., indicative of o-hydroxyacetophenones. These data indicate that esterification had taken place on the 4-hydroxyl group of the 2,4-dihydroxyacetophenone.

In a 300 ml. shaker tube was placed a solution of 112 ml. benzene, 0.2 gram of 1,1'-azobisdicyclohexanecarbonitrile and 1.5 grams of the 2-hydroxy-4-methacryloxyacetophenone prepared above. Sufficient ethylene was pressured in at room temperature to provide an autogenous pressure of approximately 13,000 p.s.i. at the polymerization temperature of 90° C. The pressure was maintained between 12,000 and 13,000 p.s.i. at 90° C. After 1½ hours the reaction was stopped, and the product was purified by washing with methanol in an Osterizer. The yield of dried polymer was 19.9 grams.

A clear 2–3 mil film was prepared by pressing a one square inch sample at 100° C. under 20 tons pressure. Infrared analysis, based on the ester band at 1725 cm.$^{-1}$, showed the presence of about 0.5 mole percent of the methacrylic ester units in the polymer. Dissolving the polymer in toluene and reprecipitation did not reduce the ester absorption, indicating that copolymerization had occurred. The inherent viscosity taken on a solution of 0.1 gram of the polymer in 100 ml. of alpha-chloronaphthalene at 125° C. was 0.74.

A 3 mil film of the copolymer was flexible after 800 hours' exposure to a bank of Westinghouse F–S ultraviolet sunlaps; a polyethylene 3 mil control film after 150 hours cracked upon flexing.

The test film showed no evidence of exudation of the stabilizer, whereas another polyethylene control film containing 2-hydroxy-4-methacryloxyacetophenone but not copolymerized with the polyethylene showed evidence of exudation on long-term exposure.

*Example 2.—Preparation of 2-hydroxy-4-acryloxyacetophenone and its copolymerization with ethylene*

A solution of 7.6 grams of 2,4-dihydroxyacetophenone in 60 ml. of water containing 2.4 grams of sodium hydroxide was treated dropwise under vigorous stirring with 4.5 grams of acrylyl chloride. After addition was completed, stirring was continued for 30 minutes. An oil was liberated which was extracted with ether. The ether solution was dried over anhydrous sodium sulfate, and ether was stripped in a vacuum oven at 50° C. leaving 7.2 grams of colorless oil.

An ultraviolet analysis of this material dissolved in carbon tetrachloride showed strong maxima in the spectral region of 3100–3300 A., indicative of o-hydroxyacetophenones. Infrared absorption at 1725 cm.$^{-1}$ was obtained which is characteristic of ester groups. These data indicate that the esterification had taken place on the 4-hydroxy group of the 2,4-dihydroxyacetophenone.

Ethylene was copolymerized with 1.5 grams of this ester in the same manner as described above in Exam- ---
[1] W. M. D. Bryant and R. C. Voter, Journal of American Chemical Society, 75, 6113 (1953).
F. W. Billmeyer, "Textbook of Polymer Chemistry," chapter 7, Interscience Publishers 1957.

ple 1. The inherent viscosity of the copolymer was 0.72. A 4 mil film of this material, prepared as described in Example 1, contained 0.5 mole percent bonded stabilizer. This film was flexible after 800 hours of exposure to a bank of Westinghouse FS sunlamps whereas the control polyethylene film cracked in 175 hours. No exudation of stabilizer from the copolymer was observed.

*Example 3.—Preparation of 2-hydroxy-4'-methacryloxybenzophenone and its copolymerization with ethylene*

2,4'-dihydroxybenzophenone (10 grams) was reacted with 5.5 methacrylchloride in the same manner as described in Example 2 except that 2.5 grams sodium hydroxide was required. The resultant light yellow solid in carbon tetrachloride showed an ultraviolet absorption maximum at 3500 A., characteristic of ortho hydroxybenzophenones. This indicated that esterification had taken place in the 4' position and that the desired product was obtained.

Copolymerization of 3.0 grams of this ester with ethylene was carried out in the same manner as described in Example 1, giving a product containing 1.0 mole percent bonded phenone stabilizing groups. A 4.0 mil film pressed from this material survived 1000 hours' exposure to the sunlamps compared to only 175 hours for a control polyethylene film.

*Examples 4–7.—Preparation of laminar structures*

As a further embodiment of this invention, a 1-mil thick film pressed from the copolymer of ethylene and 2-hydroxy-4-methacryloxyacetophenone described in Example 1 was laminated to a 5-mil thick polyethylene film. The latter had been melt pressed from low density polyethylene prepared according to the method described in U.S. Patent No. 2,153,553. A laminate was prepared by placing a 4" diameter sample of each film together and melt pressing the combination at a temperature of 100–110° C. using a pressure of 25 tons.

Under exposure to a bank of ultraviolet sunlamps, with the stabilizer-containing copolymeric film adjacent to the lamps, this laminate remained flexible after 1200 hours of exposure. A control sample of 6-mil thick polyethylene film became embrittled after a period of 300 hours' exposure.

For Examples 5 and 6, a film of high density polyethylene made by melt pressing polyethylene prepared as described in U.S. Patent No. 2,816,883 and a film of polypropylene were each laminated to ethylene/2-hydroxy-4'-methacryloxybenzophenone copolymer films. In Example 7, the ethylene/2-hydroxy-4'-methacryloxybenzophenone copolymer film was laminated to a polyethylene terephthalate film by melt pressing at a temperature of about 150° C. All laminates showed enhanced resistance to ultraviolet light degradation over the high density polyethylene, the polypropylene and the polyethylene terephthalate films alone.

*Example 8.—Copolymerization of ethylene with 2-hydroxy-4-methacryloxyacetophenone*

In a 300 ml. shaker tube was placed a solution of 110 ml. of benzene, 0.2 gram of benzoyl peroxide and 1.5 gram of 2-hydroxy-4-methacryloxyacetophenone. Thereafter, ethylene was introduced into the shaker tube under pressure at room temperature to provide an autogenous pressure of approximately 13,000 p.s.i. at the polymerization temperature of 115° C. The pressure was maintained between 12,000 and 13,000 p.s.i. at 115° C. for a period of 2 hours. After the reaction was stopped, the product was purified by washing with methanol in an Osterizer. The yield of dried polymer was 16.5 grams.

A clear 3-mil thick film was prepared by pressing a one square inch sample at 100° C. under 20 tons' pressure. Infrared analysis, based on the ester band at 1725 cm.$^{-1}$, showed the presence of approximately 0.4 mol percent of the methacrylic ester units in the polymer. Dissolving the polymer in toluene and reprecipitation produced no change in the infrared absorption indicating that copolymerization had occurred. The inherent viscosity taken on a solution of 0.1 gram of the polymer in 100 ml. of alpha-chloronaphthalene at 125° C. was 0.68.

A 3-mil thick film of the copolymer was flexible after 800 hours exposure to a bank of Westinghouse FS ultraviolet sunlamps; a polyethylene control film of the same thickness after 150 hours of exposure cracked upon flexing.

When the same copolymerization was attempted using water as the solvent in place of benzene at a reaction temperature of 115° C. and 90° C., no ethylene was absorbed.

*Examples 9–10.—Copolymerization of 2-hydroxy-4-acryloxyacetophenone with propylene and with a mixture of ethylene and propylene*

In Example 9, copolymerization of 2-hydroxy-4-acryloxyacetophenone with propylene was carried out by placing a solution of 110 ml. of benzene, 0.2 gram of alpha, alpha'-azo-bisisobutyronitrile in a 300 ml. shaker tube and applying propylene under pressure to give an autogenous pressure of approximately 13,000 p.s.i. at 90° C. for a period of 2 hours. The copolymer product contained 0.4 mol percent of the bonded phenone stabilizing group. A 3 mil film pressed from this material was flexible after 800 hours exposure to a bank of Westinghouse FS ultraviolet sunlamps; a polypropylene control film cracked upon flexing after 50 hours' exposure.

In Example 10, the 2-hydroxy-4-acryloxyacetophenone was copolymerized with a mixture of ethylene and propylene by placing 1.5 grams of the ester, 0.2 gram of 1,1'-azobisdicyclohexanecarbonitrile and 110 ml. of benzene in a 300 ml. shaker tube and applying to the reaction mixture in the tube a gas stream composed of 90% by volume of ethylene and 10% by volume of propylene at an autogenous pressure of approximately 13,000 p.s.i. at a temperature of 90° C. After 2 hours of agitation at 90° C. the reaction was stopped and the product was purified by washing with methanol in an Osterizer. The yield of dried terpolymer was 19.5 grams.

A clear film 3 mils thick was prepared by pressing a one square inch sample at 100° C. under 20 tons pressure. Infrared analysis, based on the ester band at 1725 cm.$^{-1}$, showed the presence of about 0.5 mol percent of the light stabilizing comonomer units in the polymer. The inherent viscosity taken on a solution of 0.09 gram of the polymer in 100 ml. of alpha-chloronaphthalene at 125° C. was 0.55.

The film of the copolymer was flexible after 700 hours exposure to a bank of Westinghouse FS ultraviolet sunlamps; an ethylene/propylene copolymer control film cracked upon flexing after 75 hours' exposure.

As indicated in the examples and in the foregoing discussion, the light-stabilizing monomers can be copolymerized with polymerizable unsaturated compounds such as ethylene, propylene, etc. However, any ethylenically unsaturated compound falling within the formula

may be used.

Thus, butene-1, pentene-1, or hexene-1 may also be used.

One of the most surprising aspects of the present invention lies in the preparation of the polymerizable light stabilizing monomer. It should be noted that the starting material is an aromatic compound having substituted thereon two hydroxyl groups, one of which is ortho to a carbonyl group. It is believed that this hydroxyl group ortho to the carbonyl group provides the ultraviolet light stabilizing qualities of the compound. When this compound is converted to the acrylic ester or to the alkyl-substituted acrylic ester, it is unexpectedly found that it is the other hydroxyl group (not the hydroxyl group ortho to the carbonyl group) that apparently reacts exclusively. Thus, the resulting monomer retains its ultraviolet light resistant qualities.

It is also interesting to note that despite the harshness of the copolymerization process from the standpoint of temperature and pressure, the afore-mentioned ortho-hydroxyl group is not destroyed nor even affected adversely. It is of further interest that the chelated hydroxyl group does not appear to inhibit polymerization; this is indeed surprising inasmuch as phenolic compounds such as tertiary butylphenol, hydroquinone, tertiary butyl catechol and the like have long been established as agents which can be added to monomeric systems to inhibit polymerization. The final copolymer contains this hydroxyl group in pendant groups attached to the polymeric chain to provide the long-lasting weather-resistant properties in the copolymeric structures.

As copolymeric structures, self-supporting films, supported films (laminates and coatings), filaments, tubing, etc., can be formed from these copolymers for important commercial applications. Thus, these copolymeric structures will find utility in the preparation of greenhouses, exterior screening, garden hose, as part of automobile exteriors, etc. either as the structural material itself or by being placed between a structural material or article that is susceptible to degradation from ultraviolet light and the ultraviolet light source.

It is also possible to graft copolymerize the polymerizable light stabilizing monomer on to a prepolymerized ethylenic or other unsaturated compound of the type defined hereinbefore. This would be especially useful where it was desired to confine the light stabilizing composition to the surface as a coating.

The main advantage of the copolymer of this invention is that a high proportion of the light-stabilizing component can be incorporated in a copolymer to give enhanced resistance to degradation from ultraviolet light without causing haziness in the film. It is also clear that the light-stabilizing function is essentially permanent. A further advantage is that a separate processing step, such as milling or dissolution, is not required to incorporate the light-stabilizing composition into the base polymer. The copolymer and its light-stabilizing qualities are provided during the one-step copolymerization. Moreover, incorporation of the light stabilizer by copolymerization in this manner can be done in conventional polymerization equipment.

Having fully described the invention, what is claimed is:

1. A weather-resistant polymeric composition comprising a linear copolymer of 90–99.99 mole percent of at least one unsaturated compound, compound A, having the structural formula:

wherein $R_1$ is selected from the group consisting of hydrogen and alkyl having 1–4 carbon atoms,
$R_2$ is hydrogen,
and .01–10 mole percent of at least one unsaturated compound, compound B, selected from the group consisting of:

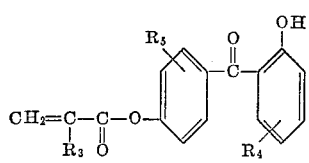

and

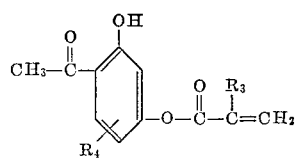

wherein $R_3$ is selected from the group consisting of hydrogen and alkyl having 1–3 carbon atoms,
$R_4$ and $R_5$ are each selected from the group consisting of hydrogen, halogen, alkyl and alkoxy.

2. A weather-resistant self-supporting film which comprises a linear copolymer of 90–99.99 mole percent of at least one unsaturated compound, compound A, having the structural formula:

wherein $R_1$ is selected from the group consisting of hydrogen and alkyl having 1–4 carbon atoms,
$R_2$ is selected from the group consisting of hydrogen, and .01–10 mole percent of at least one unsaturated compound, compound B, selected from the group consisting of

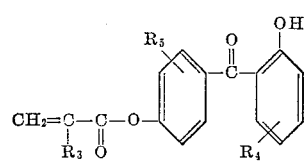

and

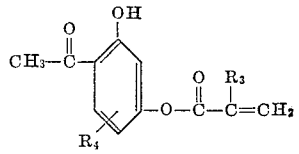

wherein $R_3$ is selected from the group consisting of hydrogen and alkyl having 1–3 carbon atoms,
$R_4$ and $R_5$ are each selected from the group consisting of hydrogen, halogen, alkyl and alkoxy.

3. A linear copolymer of 90–99.99 mole percent of at least one unsaturated compound selected from group A consisting of ethylene and propylene and .01–10 mole percent of at least one ethylenically unsaturated compound selected from group B consisting of 2-hydroxy-4'-methacryloxybenzophenone, 2-hydroxy-4'-acryloxybenzophenone, 2-hydroxy-4-methacryloxyacetophenone and 2-hydroxy-4-acryloxyacetophenone.

4. A linear copolymer as in claim 3 wherein at least one unsaturated compound of group A is ethylene.

5. A linear copolymer as in claim 3 wherein at least one unsaturated compound of group A is propylene.

6. A linear copolymer as in claim 3 wherein at least one ethylenically unsaturated compound of group B is 2-hydroxy-4-methacryloxyacetophenone.

7. A linear copolymer as in claim 3 wherein at least one ethylenically unsaturated compound of group B is 2-hydroxy-4-acryloxyacetophenone.

8. A process for preparing weather-resistant polymeric material which comprises copolymerizing at least one compound, compound A, having the stuctural formula:

wherein $R_1$ is selected from the group consisting of hydrogen and alkyl having 1–4 carbon atoms,
$R_2$ is hydrogen,
and .01–10 mole percent of at least one unsaturated compound, compound B, selected from the group consisting of:

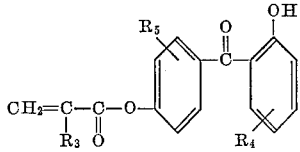

and

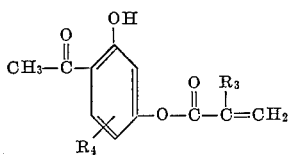

wherein $R_3$ is selected from the group consisting of hydrogen and alkyl having 1–3 carbon atoms, $R_4$ and $R_5$ are each selected from the group consisting of hydrogen, halogen, alkyl and alkoxy, in a solvent for said compounds selected from the group consisting of hexane, benzene, toluene, cyclohexane, bromobenzene, chlorobenzene, o-dichlorobenzene, tetrachloroethylene, dichloromethane, 1,1,2,2-tetrachloroethane, tetrahydrofuran, thiophene and dioxane to form a mixture; subjecting the mixture to a temperature of 25°–175° C. and a pressure of 800–3,000 atmospheres in the presence of a catalyst capable of generating free radicals for a time sufficient to form a polymer.

9. A process as in claim 8 wherein at least one compound A is ethylene.

10. A process as in claim 8 wherein at least one compound B is a 2-hydroxy-4-methacryloxyacetophenone.

11. A process as in claim 8 wherein at least one compound B is 2-hydroxy-4-acryloxyacetophenone.

12. A laminate comprising a base layer adherably associated with a top layer, said top layer being a linear copolymer of at least one unsaturated compound having the structural formula:

wherein $R_1$ is selected from the group consisting of hydrogen and alkyl having 1–4 carbon atoms, $R_2$ is hydrogen, and .01–10 mole percent of at least one unsaturated compound, selected from the group consisting of:

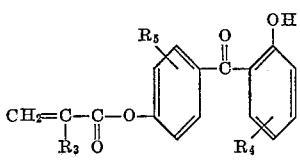

and

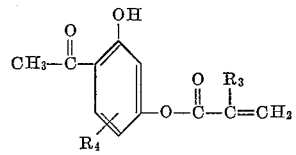

wherein $R_3$ is selected from the group consisting of hydrogen and alkyl having 1–3 carbon atoms, $R_4$ and $R_5$ are each selected from the group consisting of hydrogen, halogen, alkyl and alkoxy.

13. A laminate as in claim 12 where said base is a polyethylene film.

14. A laminate as in claim 12 where said base is a polypropylene film.

15. A laminate as in claim 12 where said base is a polyethylene terephthalate film.

16. A process for protecting an article susceptible to ultraviolet light degradation which comprises placing a film of a linear copolymer of at least one unsaturated compound having the structural formula:

wherein $R_1$ is selected from the group consisting of hydrogen and alkyl having 1–4 carbon atoms, $R_2$ is hydrogen, and .01–10 mole percent of at least one unsaturated compound selected from the group consisting of:

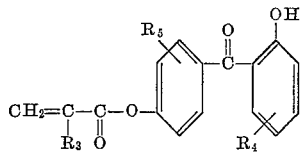

and

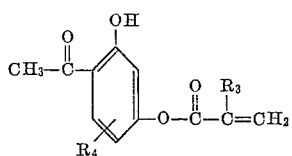

wherein $R_3$ is selected from the group consisting of hydrogen and alkyl having 1–3 carbon atoms, $R_4$ and $R_5$ are each selected from the group consisting of hydrogen, halogen, alkyl and alkoxy, between said article and the ultraviolet light source.

References Cited by the Examiner

UNITED STATES PATENTS

| | | | |
|---|---|---|---|
| 2,938,883 | 5/1960 | Raich. | |
| 2,970,066 | 1/1961 | Brasure | 161—190 |
| 2,976,259 | 3/1961 | Hardy et al. | 88—106 |
| 2,989,416 | 6/1961 | Standish | 88—106 |
| 2,990,306 | 6/1961 | Dyer | 161—408 |
| 3,215,665 | 11/1965 | Sharetts. | |

FOREIGN PATENTS 1,183,245   7/1959   France.

EARL M. BERGERT, *Primary Examiner.*

W. E. HOAG, *Assistant Examiner.*